(12) United States Patent
O'Brien

(10) Patent No.: US 11,225,789 B2
(45) Date of Patent: Jan. 18, 2022

(54) STRUCTURAL MODULE WITH VERTICAL TIES

(71) Applicant: SPANMINX LIMITED, London (GB)

(72) Inventor: John O'Brien, London (GB)

(73) Assignee: Spanminx Limited, London (GB)

(*) Notice: Subject to any disclaimer, the term of this patent is extended or adjusted under 35 U.S.C. 154(b) by 0 days.

(21) Appl. No.: 17/052,176

(22) PCT Filed: Apr. 2, 2019

(86) PCT No.: PCT/EP2019/058267
§ 371 (c)(1),
(2) Date: Oct. 31, 2020

(87) PCT Pub. No.: WO2019/219286
PCT Pub. Date: Nov. 21, 2019

(65) Prior Publication Data
US 2021/0123229 A1   Apr. 29, 2021

(30) Foreign Application Priority Data

May 17, 2018 (EP) .................................. 18172914

(51) Int. Cl.
*E04B 1/348* (2006.01)
*E04C 3/32* (2006.01)
(Continued)

(52) U.S. Cl.
CPC .............. *E04B 1/3483* (2013.01); *E04C 3/32* (2013.01); *F16B 7/182* (2013.01); *E04B 2001/3583* (2013.01)

(58) Field of Classification Search
CPC .. E04B 1/3483; E04B 2001/3583; E04C 3/32; E04C 3/30; F16B 7/182
See application file for complete search history.

(56) References Cited

U.S. PATENT DOCUMENTS

| 3,429,092 A * | 2/1969 | Hart ........................ E04B 1/20 52/653.1 |
| 3,782,061 A * | 1/1974 | Minutoli .................. E04B 1/06 52/125.5 |

(Continued)

FOREIGN PATENT DOCUMENTS

| EP | 0 378 523 B1 | 3/1993 |
| EP | 1 971 727 B1 | 11/2011 |

(Continued)

OTHER PUBLICATIONS

International Preliminary Report on Patentability (Chapter I) for PCT/EP2019/058267 (8 pages). (Year: dated 2020).*

(Continued)

*Primary Examiner* — Rodney Mintz
(74) *Attorney, Agent, or Firm* — Studebaker & Brackett PC

(57) ABSTRACT

A vertical tie is for a load-bearing column of a building off-site structural module with a box-section structural member. The tie has a top tie assembly for engagement by a torqueing tool from above the column. There is a bottom tie assembly, which fastens to the module below. Torque which is applied to the top tie assembly is transferred to the bottom tie assembly by an interconnect tube. The top and bottom tie assemblies are configured so that the bottom tie assembly is adapted to engage with a top tie assembly of an underneath module, in one case by a nut engaging a spindle protruding up from the lower module. This allows modules to be tied together in the vertical direction in a simple, convenient, and safe manner by an operator on-site working on top of the upper module. Access to torque the tie does not require any side opening in the column and so its load-bearing properties are not affected.

12 Claims, 10 Drawing Sheets

(51) Int. Cl.
*F16B 7/18* (2006.01)
*E04B 1/35* (2006.01)

(56) References Cited

U.S. PATENT DOCUMENTS

| | | | | |
|---|---|---|---|---|
| 3,965,627 | A | 6/1976 | Fencl | |
| 4,081,936 | A * | 4/1978 | Wise | E04B 1/21 403/293 |
| 4,694,621 | A * | 9/1987 | Locke | E04B 1/3483 52/79.13 |
| 5,471,804 | A * | 12/1995 | Winter, IV | E04B 1/14 403/231 |
| 5,570,549 | A * | 11/1996 | Lung | E04H 9/14 52/295 |
| 6,151,844 | A * | 11/2000 | Kovachevich | E04B 1/10 52/167.1 |
| 6,871,453 | B2 * | 3/2005 | Locke | E04B 1/3483 52/79.13 |
| 8,919,058 | B2 * | 12/2014 | Liberman | E04B 1/34384 52/283 |
| 9,366,020 | B2 * | 6/2016 | Farnsworth | E04B 1/22 |
| 10,605,284 | B2 * | 3/2020 | Taneichi | E04B 1/2604 |
| 10,954,684 | B2 * | 3/2021 | Rudlinger | F16F 15/04 |
| 11,085,181 | B2 * | 8/2021 | O'Brien | E04B 1/3483 |
| 2004/0182016 | A1 * | 9/2004 | Locke | E04B 1/22 52/79.13 |
| 2011/0173907 | A1 * | 7/2011 | Katsalidis | E04C 3/30 52/236.3 |
| 2012/0110928 | A1 * | 5/2012 | Liberman | E04G 21/142 52/122.1 |
| 2014/0123573 | A1 * | 5/2014 | Farnsworth | E04H 1/04 52/79.9 |
| 2017/0350150 | A1 | 12/2017 | Rüdlinger | |
| 2018/0135676 | A1 * | 5/2018 | Taneichi | F16B 37/0857 |
| 2020/0165810 | A1 * | 5/2020 | O'Brien | B65D 90/08 |

FOREIGN PATENT DOCUMENTS

| | | |
|---|---|---|
| EP | 2 456 928 B1 | 9/2015 |
| JP | WO2012/070281 A1 | 5/2012 |
| WO | 2012/070281 A1 | 5/2012 |
| WO | 2017/100835 A1 | 6/2017 |

OTHER PUBLICATIONS

International Search Report issued in PCT/EP2019/058267; dated Jun. 25, 2019.

* cited by examiner

STRUCTURAL MODULE WITH VERTICAL TIES

INTRODUCTION

The invention relates to a tie for a structural module for building construction, and to modules incorporating such ties.

EP0378523 describes a system for constructing buildings utilizing a conical connector to fasten rods connecting structural members of a building.

U.S. Pat. No. 3,965,627 describes interconnection of a structure comprising a modular assembly and a substructure supporting it.

US2014/123573 describes a modular unit connection system for joining together a plurality of box-shaped modular units to form a single or multi-story building.

WO2012070281 describes a connection method for a container-type unit building.

EP1971727 and EP2456928 describe structural modules.

Construction of a building from structural modules typically involves erecting a reinforced concrete core on site, incorporating a stairwell and lift shaft. Modules are manufactured off site and are delivered and placed by crane one atop the other for the desired number of levels. The modules adjoining the core are tied to the core using a tie arrangement such as described in EP2456928. Also, adjoining modules may be tied directly together in the horizontal direction, and tie plates such as shown in EP2456928 may be used.

The present invention is directed towards providing for enhanced of interconnection of structural modules, particularly for high-rise buildings having in excess of ten storeys.

SUMMARY OF THE INVENTION

We describe a vertical tie as set out in claims 1 to 13, a structural module load-bearing column as set out in claims 14 to 17, a structural module as set out in claims 18 and 19, and a method of fastening a structural module to another in claim 20.

We describe a vertical tie for a load-bearing column of a building off-site structural module, the column comprising a vertical structural member having a top end and a bottom end,
  in which the vertical tie comprises:
    a top tie assembly,
    a bottom tie assembly, and
    an interconnect member interconnecting said top and bottom assemblies.

The vertical tie is preferably configured to fit within the load-bearing column.

Preferably, the top tie assembly comprises a tool interface to engage a tool for application of torque, and said bottom tie assembly is adapted to engage an underneath module frame by application of torque to the tool interface and transfer of said torque by the interconnect member.

Preferably, said top and bottom tie assemblies are configured so that the bottom tie assembly is adapted to engage with a top tie assembly of an underneath module.

Preferably, the column has a tubular configuration, preferably box-section, and the vertical tie is within the column.

Preferably, said tool interface is a socket having an internal shape such as hexagonal.

Preferably, the top tie assembly comprises a fastener which is engageable after operation of the tool, to protrude above the column.

Preferably, the fastener comprises a spindle engaging a receiver of the top tie assembly.

Preferably, said receiver is aligned with the tool interface and is configured to allow a tool to pass through the receiver while engaging the tool interface, whereby the fastener may be engaged with the receiver after removal of the tool.

Preferably, the receiver is connected to a column top capping plate.

Preferably, the top tie assembly comprises a housing containing said axially-aligned receiver and said tool interface.

Preferably, the bottom tie assembly comprises a nut or engaging a bolt or spindle of a lower module frame.

Preferably, the interconnect member is tubular, preferably with a circular cross-sectional shape.

Preferably, the bottom tie assembly comprises a bottom capping plate having a through-hole to receive a fastener part of a lower module frame.

The bottom tie assembly may comprise a housing surrounding axially-aligned fastener parts.

We also describe a structural module load-bearing column comprising a vertical structural member and a vertical tie of any embodiment.

Preferably, the tie is within the vertical structural member.

Preferably, the vertical structural member has a box-section configuration.

Preferably, the column comprises top and/or bottom capping plates at each end of the vertical structural member, and wherein the tie is affixed to one or both of said top and bottom capping plates.

We also describe a structural module comprising structural members including a plurality of load-bearing structural columns.

Preferably, said columns are at each corner of the module, forming corner posts.

DETAILED DESCRIPTION OF THE INVENTION

The invention will be more clearly understood from the following description of some embodiments thereof, given by way of example only with reference to the accompanying drawings in which:—

Figure 1:
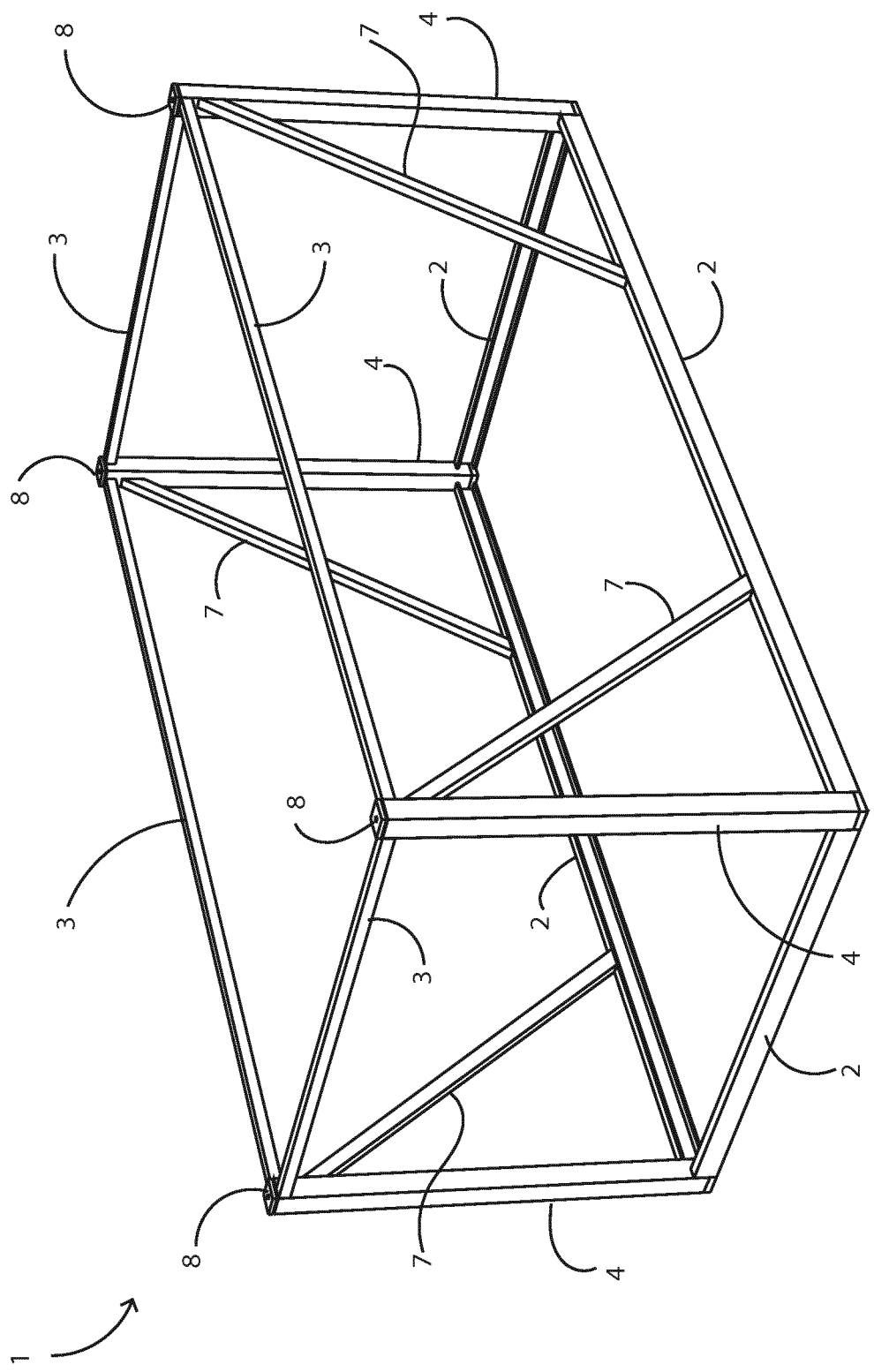
FIG. 1 is a perspective view of the structural frame of a structural module of the invention.

In summary, a vertical tie is for a load-bearing column 4 of a building off-site structural module 1 with a box-section structural member 30. The tie has a top tie assembly 35 for engagement by a torqueing tool 70 from above the column. There is a bottom tie assembly 36, which fastens to the module below. Torque which is applied to the top tie assembly 35 is transferred to the bottom tie assembly by an interconnect tube 33. The top and bottom tie assemblies are configured so that the bottom tie assembly 36 is adapted to engage with a top tie assembly 35 of an underneath module, in one case by a nut engaging a spindle protruding up from the lower module. This allows modules to be tied together in the vertical direction in a simple, convenient, and safe manner by an operator on-site working on top of the upper module. Access to torque the tie does not require any side opening in the column and so its load-bearing properties are not affected.

In more detail, referring to FIGS. 1 to 4 a structural, load-bearing, frame 1 of an off-site structural module is shown. The module 1 provides one or more rooms, such as one half of an apartment in a high-rise building of for example more than twenty storeys. The modules are configured to take the considerable load of the modules directly above it. The frame 1 comprises structural steel members forming:

Channel-section floor plates 2,
Box-section wall plates 3,
Box-section corner posts 4,
Box-section braces 7, and
Post top capping plates 8.

Figure 2:
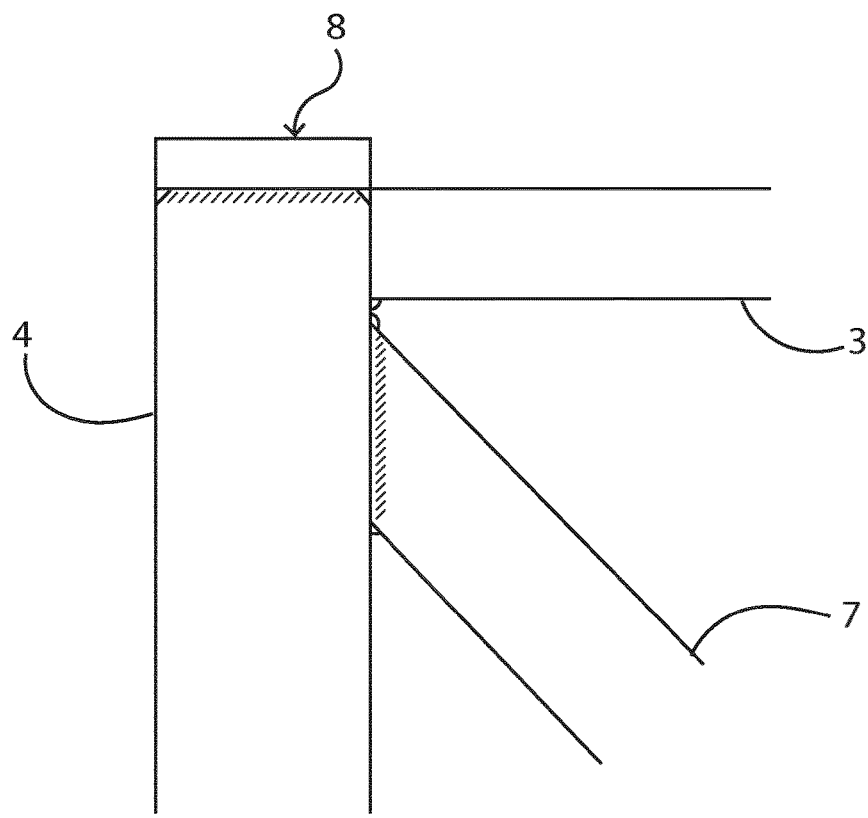
FIGS. 2 to 4 are more detailed views showing joints of structural members of the frame.
Figure 3:
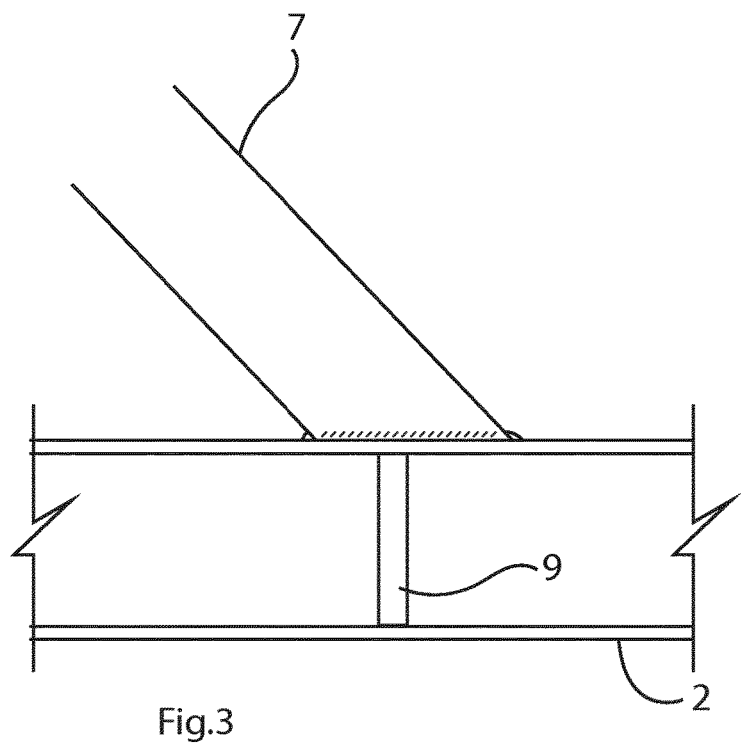
Figure 4:
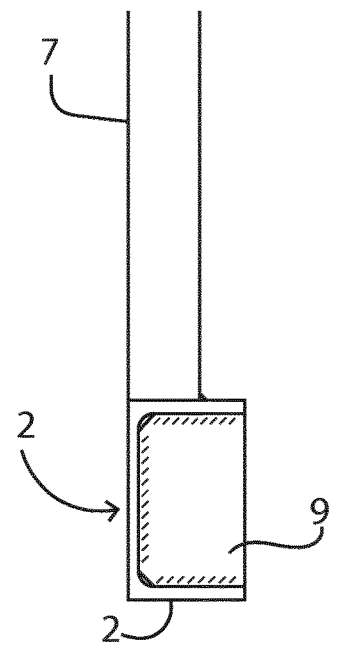

As shown in FIGS. 2 to 4 the floor plates 2 are of C-shaped channel configuration and include a stiffening rectangular plate 9 spanning the flanges at the location of each brace 7 connection.

The vertical load is taken by the corner posts 4, also referred to as structural columns, with assistance from the braces 7, the floor plates 2 and the wall plates 3.

Figure 5:
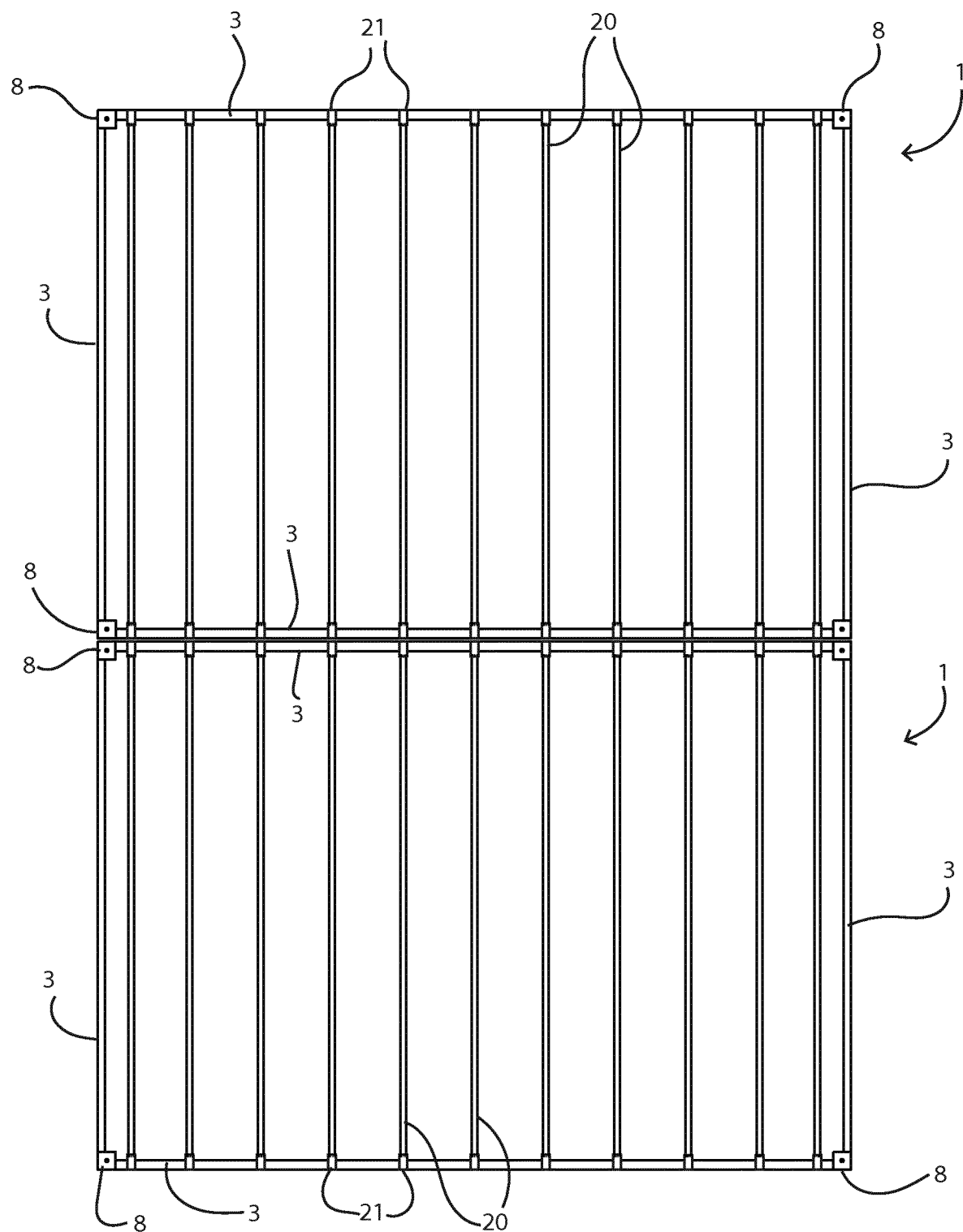
FIG. 5 is a plan view of the frame after placing of ceiling trusses.

As shown in FIG. 5 a module also includes a series of ceiling trusses 20 placed across parallel opposing wall plates 3. A module further comprises wall studs, not shown, for supporting internal wall cladding and insulation, but not contributing significantly to structural load strength.

Figure 6:
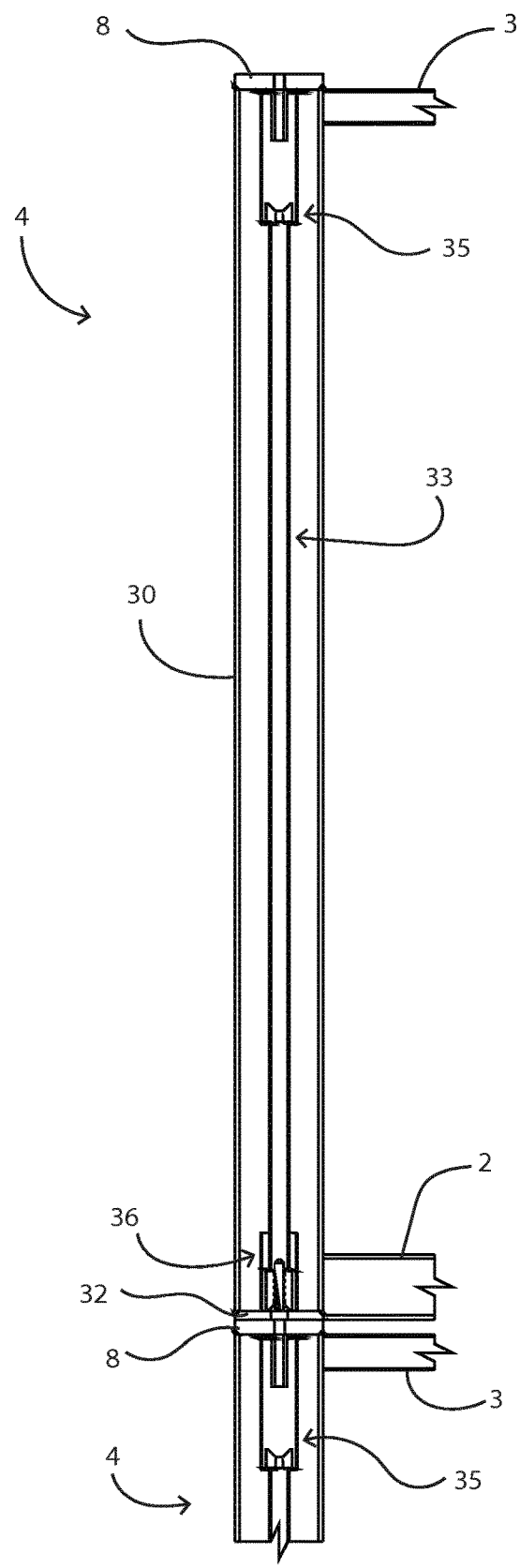
FIG. 6 is a sectional view along the height of a load-bearing column forming a corner post of the module.

Referring to FIG. 6 each column 4 comprises a structural member 30 of square cross-section capped top and bottom by capping plates 8 and 32. Each column 4 contains a vertical tie which engages a corresponding vertical tie in each of the adjoining lower and/or upper modules.

There is preferably a vertical tie in each column, although this is not essential, especially for columns adjoining a building core or if there are other interconnections such as a plate welded across modules on the outer surfaces of adjacent columns. Each tie comprises an upper assembly 35, an interconnect member which in this case is a tube 33 running within and along the length of the column 4, and a lower tie assembly 36. As shown in FIG. 6 the lower tie assembly 36 of an upper module is affixed to the upper tie assembly 35 of the lower module.

Figure 7:
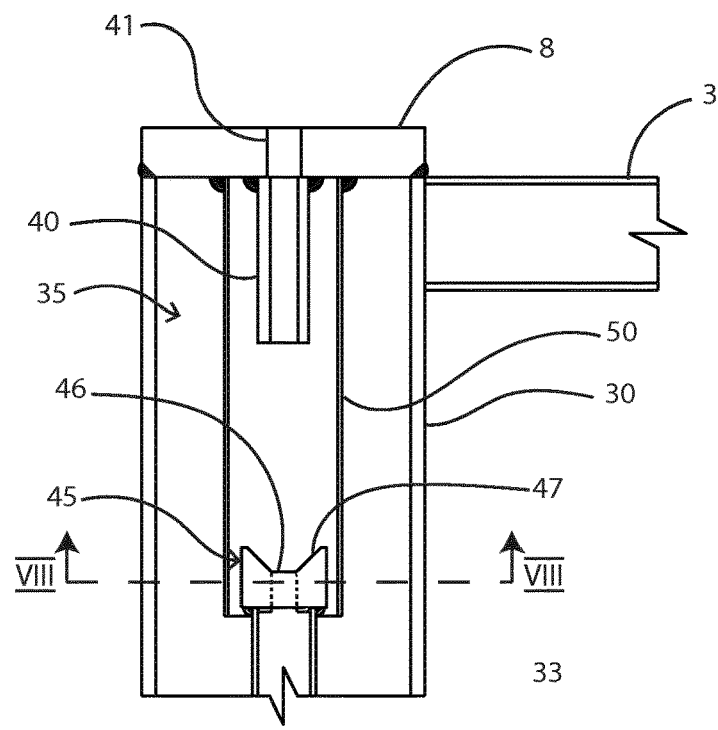
FIG. 7 is a vertical sectional view showing a top assembly of a vertical tie within the column.
Figure 8:
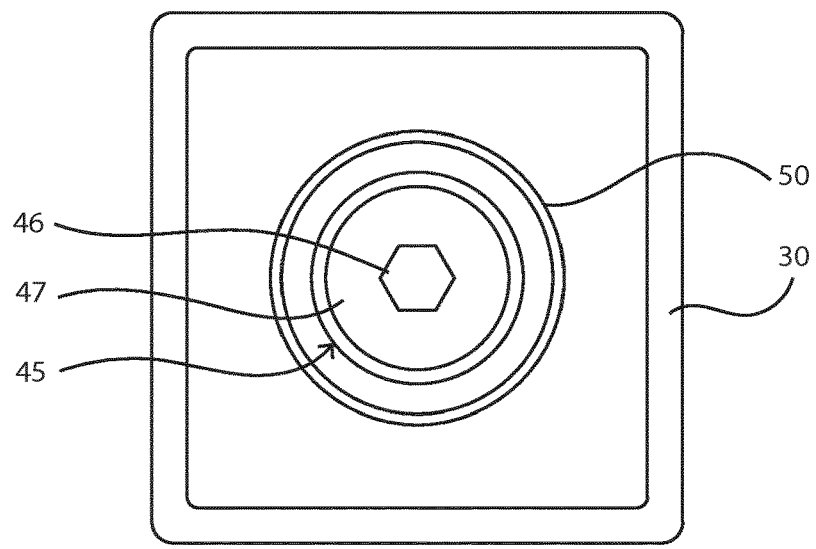
FIG. 8 is a cross-sectional view in the direction of the arrows VIII-VIII in FIG. 7.
Figure 9:
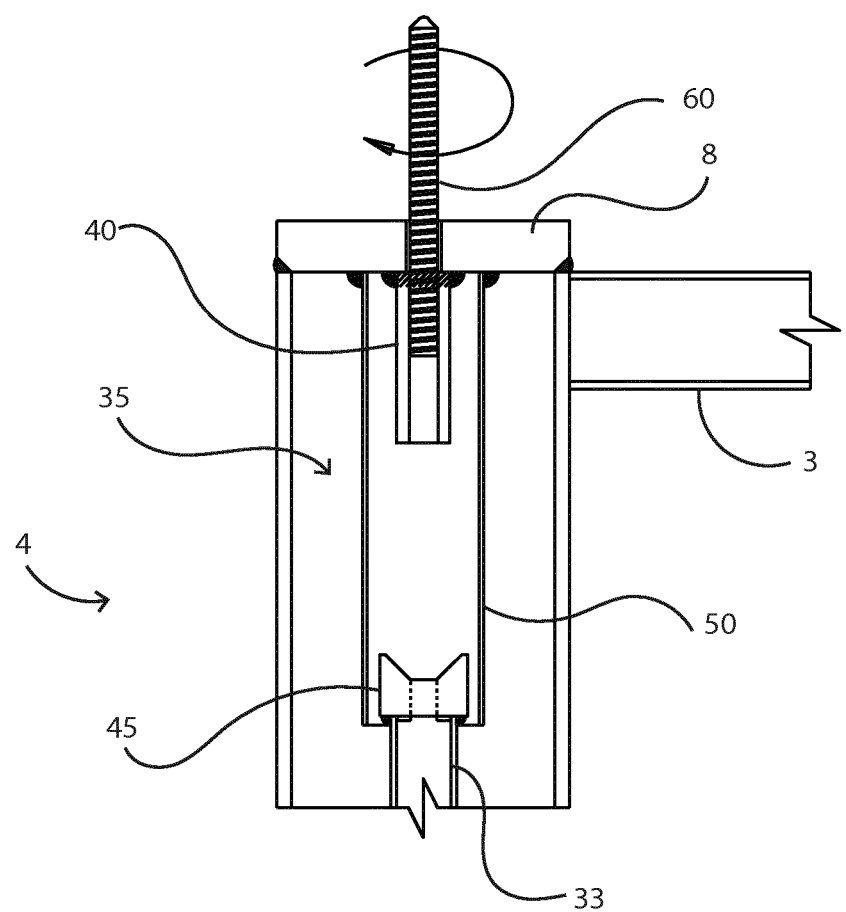
FIG. 9 shows connection of a spindle to a module so that it is ready for placement of the next module.

In more detail, referring to FIGS. 7 to 9 the tie top tie assembly 35 comprises an internally-threaded tubular receiver 40 welded to the top cap plate 8, aligned with a through hole 41 of the plate 8. The receiver 40 is axially aligned with a tool interface which in this case is a socket 45 having a hexagonal internal through hole 46 and being welded to the interconnect tube 33. The socket has a tapered mouth 47 to guide insertion of a tool into the socket 45. The receiver 40 and the socket 45 are mounted within a tubular housing 50, which is also welded to the top capping plate 8. FIG. 9 shows insertion of a fastener element which is in this case a threaded spindle 60 into the receiver 40 to prepare the top of a column 8 to receive the next module placed on top.

Figure 10:
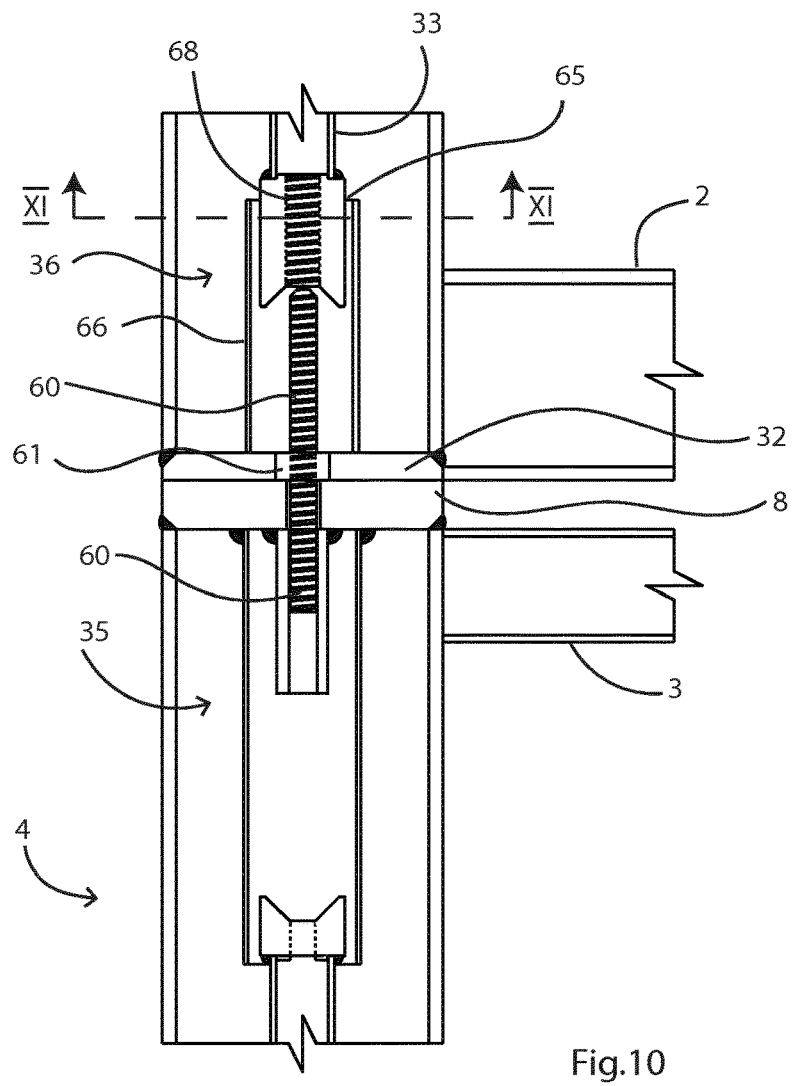
FIG. 10 is a vertical sectional view also showing the bottom assembly of a vertical tie of a module placed on top.
Figure 11:
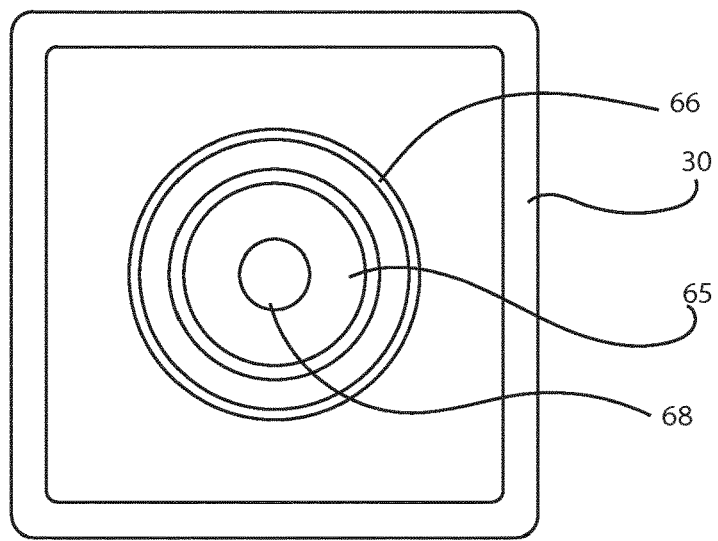
FIG. 11 is a cross-sectional view in the direction of the arrows XI-XI of FIG. 10.

FIGS. 10 and 11 show the situation where the next module has been placed. The spindle 60 extends through a through-hole 61 of the lower capping plate 32 of the next module's corresponding column. The lower tie assembly 36 comprises a nut 65 axially aligned with the spindle 60 and being attached to the interconnect tube 33. The nut 65 is within the tubular housing 66 of the lower tie assembly 36. Internal threads of the nut 65 are indicated by the numeral 68.

Figure 12:
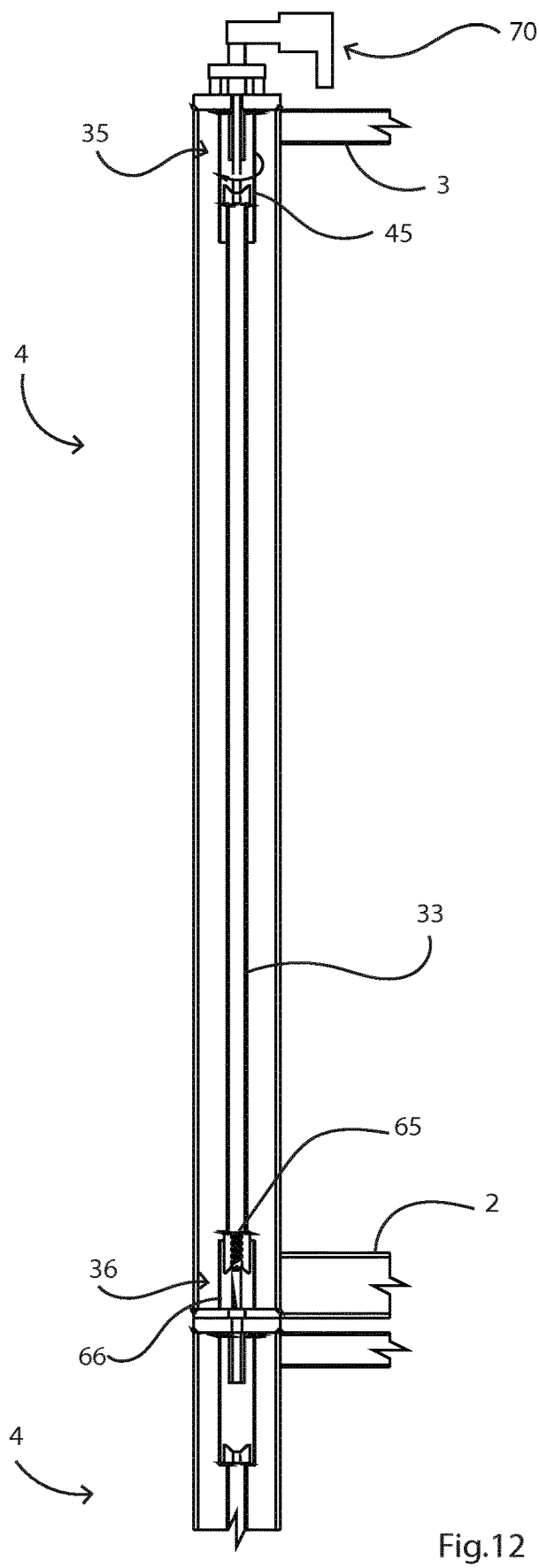
FIG. 12 is a vertical sectional view of the full column of the upper module and the top assembly of the tie of the lower module, with an actuator completing tying of these modules together.
Figure 13:
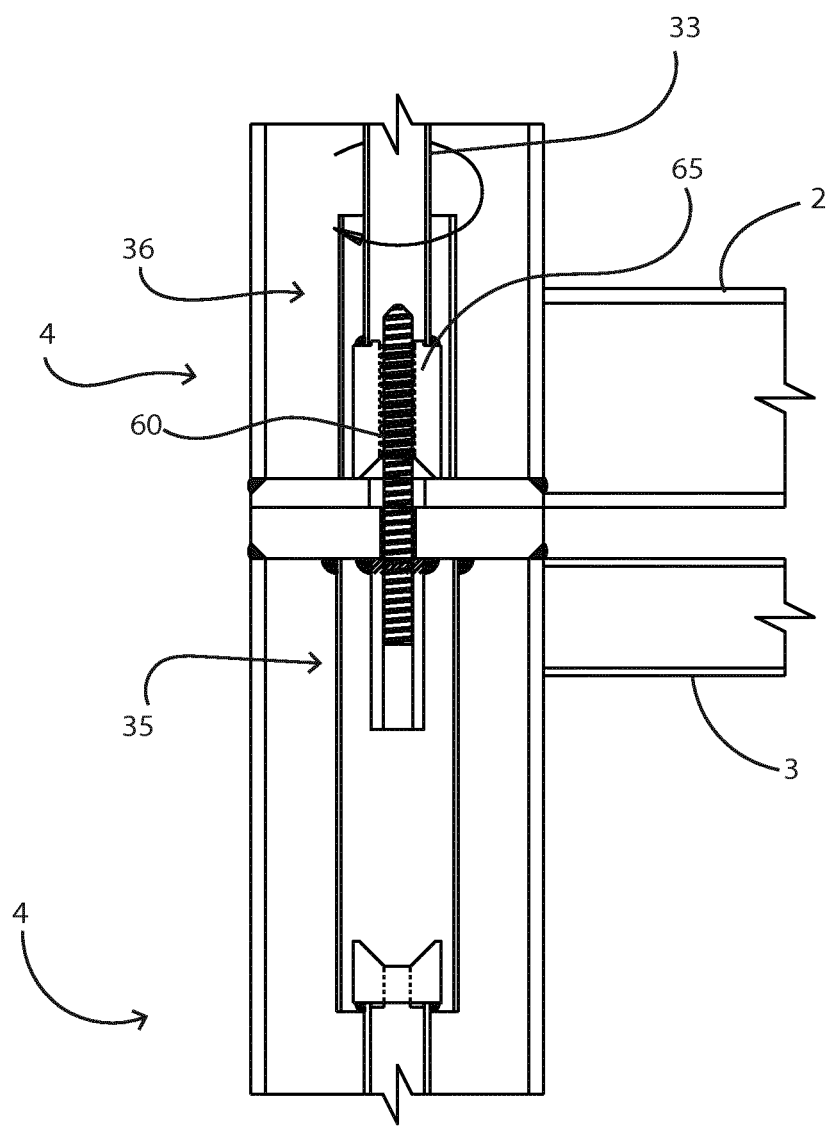
FIG. 13 shows more detail of the top and bottom assembly engagement.
Figure 14:
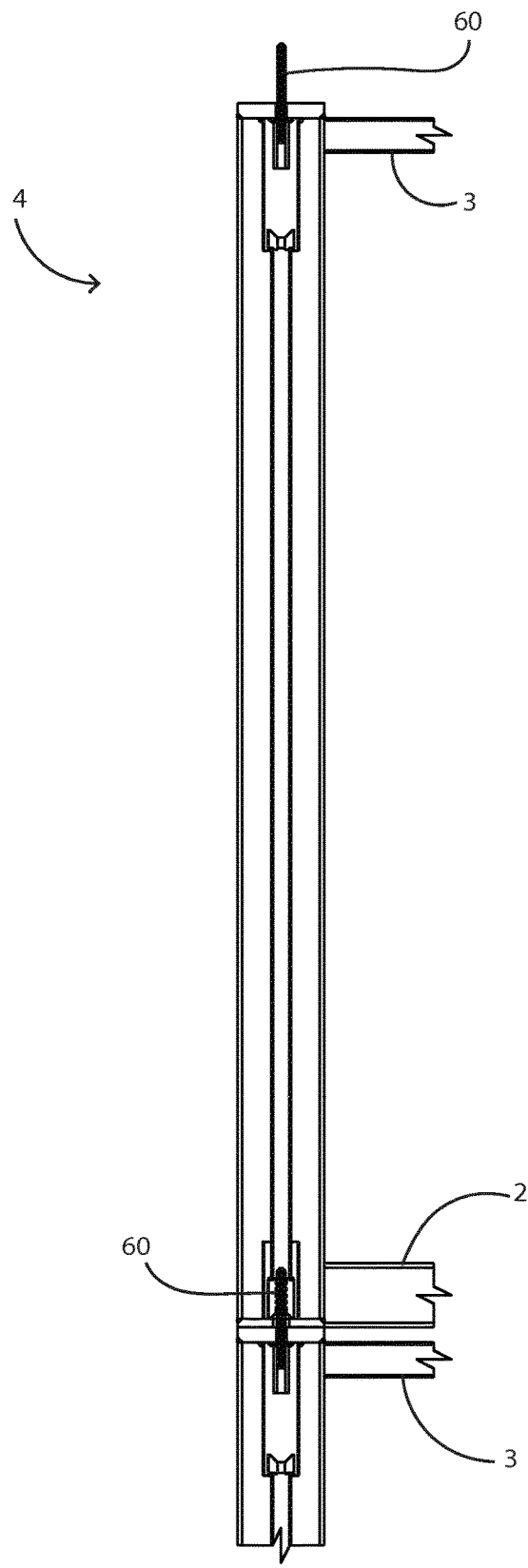
FIG. 14 shows the completed tie and the upper module ready for placement of a next module.

Referring to FIGS. 12 to 14 a vertical tying connection is completed by simply inserting a tool 70 into the socket 45, rotating the socket and the interconnect tube, and hence the nut 65. The nut 65 therefore moves downwardly on the spindle 60 with which it is engaged. The tool operation is continued until the nut 65 is fully engaged and has reached its lowermost position, pulling the spindle 60 upwardly, and hence pulling on the column 4 of the lower module.

The threaded fastening is very strong, providing an excellent connection for vertical tying and horizontal resistance. The tie is mainly useful in the event of disproportionate collapse and the horizontal resistance is very effective for stability forces.

The typical torque applied is 1100 Nm in one example. Due to the diameter of the interconnect tube 33 it is easy and convenient to transfer such torque from the tool interface. In one embodiment the interconnect tube has a diameter of 48 mm.

It will be appreciated that the task of engaging the vertical ties of adjoining module columns is very simple: engaging the spindle 60 in the lower module and after placing the upper module, operating the tool from above to tighten the nut 65. There is of course convenient access to the top tie assembly of the upper module column to operate the tool. Once the tool 70 is operated to fasten the tie, another spindle 60 is engaged for placement of the next module and so on until the uppermost module is placed.

It will be appreciated that the vertical tie is achieved without need to affect structural integrity of the load-bearing column. The tie is completely within the column, and access is only needed axially from above—both to insert the spindle 60 before upper module placement, and to tighten the nut after such placement.

ALTERNATIVES

The invention is not limited to the embodiments described but may be varied in construction and detail. For example, connection of a tool interface to a fastener part may be achieved by a member other than a tube, such as by a rod, although a tube is advantageous for transferring high torque. The tool interface socket may be of any desired configuration for engaging a tool, not necessarily a socket. For example, it could have a male configuration for engaging a female tool part. It is envisaged that the tool interface is at a lower position, requiring a shorter interconnect member.

It is envisaged that the tie may be deployed outside of a column/post, for example being aligned alongside it, possibly within a housing alongside the column.

The invention claimed is:

1. A building structural module comprising:
   structural members including a plurality of load-bearing structural columns, each said column comprising a vertical structural member, a top capping plate at a top end of the vertical structural member, and a bottom capping plate at a bottom end of the vertical structural member, and a vertical tie, in which each said vertical tie comprises:
a top tie assembly,
a bottom tie assembly, and
an interconnect member interconnecting said top and bottom assemblies,
wherein:
the vertical tie is configured to fit within the load-bearing column,
the top tie assembly comprises a tool interface configured to engage a tool for application of torque,
said bottom tie assembly is configured to engage an underneath module structural column by application of torque to said tool interface and transfer of said torque by the interconnect member,
said top and bottom tie assemblies are configured so that the bottom tie assembly engages with a top tie assembly of the underneath module structural column,
the top tie assembly comprises a fastener which is engageable after operation of the tool, to protrude above the load-bearing structural column, the fastener comprising a bolt or spindle engaging a receiver of the top tie assembly, and said receiver is axially-aligned with the tool interface and is configured to allow the tool to pass through the receiver while engaging the tool interface, whereby the fastener is configured to be engaged with the receiver after removal of the tool,
the top tie assembly comprises the top capping plate and the receiver is connected to the top capping plate,
the bottom tie assembly comprises the bottom capping plate, and said bottom capping plate comprises a through-hole configured to receive said spindle, and
the top tie assembly comprises a housing containing said axially-aligned receiver and said tool interface.

2. The structural module as claimed in claim 1, wherein said columns are at each corner of the module, forming corner posts.

3. The structural module as claimed in claim 1, wherein at least one column has a tubular configuration, and each said vertical tie is within said column.

4. The structural module as claimed in claim 1, wherein each said tool interface is a socket having an internal shape.

5. The structural module as claimed in claim 1, wherein each said bottom tie assembly comprises a nut for engaging a bolt or spindle of a lower module frame.

6. The structural module as claimed in claim 1, wherein each interconnect member is tubular.

7. The structural module as claimed in claim 1, wherein each said interconnect member has a circular cross-sectional shape.

8. The structural module as claimed in claim 1, wherein each said bottom tie assembly comprises a housing surrounding axially-aligned fastener parts.

9. The structural module as claimed in claim 1, wherein the tie is positioned within the vertical structural member of the load-bearing column.

10. The structural module as claimed in claim 1, wherein the vertical structural member has a box-section configuration.

11. The structural module as claimed in claim 1, wherein the tie is affixed to one or both of said top and bottom capping plates.

12. A method of fastening the building structural module of claim 1, including an upper structural module and a lower structural module, the method comprising:
connecting a respective said fastener to the top tie assembly of each load-bearing column of the lower module;
placing the upper module atop the lower module with each fastener inserted in a corresponding bottom tie assembly of the upper module; and
using access from above the upper module using the tool, engaging each top tie assembly of the upper module to tighten each bottom tie assembly of the upper module to each said fastener.

* * * * *